INVENTOR.
OLUF G. OSWOLD

June 14, 1960     O. G. OSWOLD     2,940,357
ADJUSTING MECHANISM FOR SLIT LAMP APPARATUS
Filed March 7, 1955     2 Sheets-Sheet 2
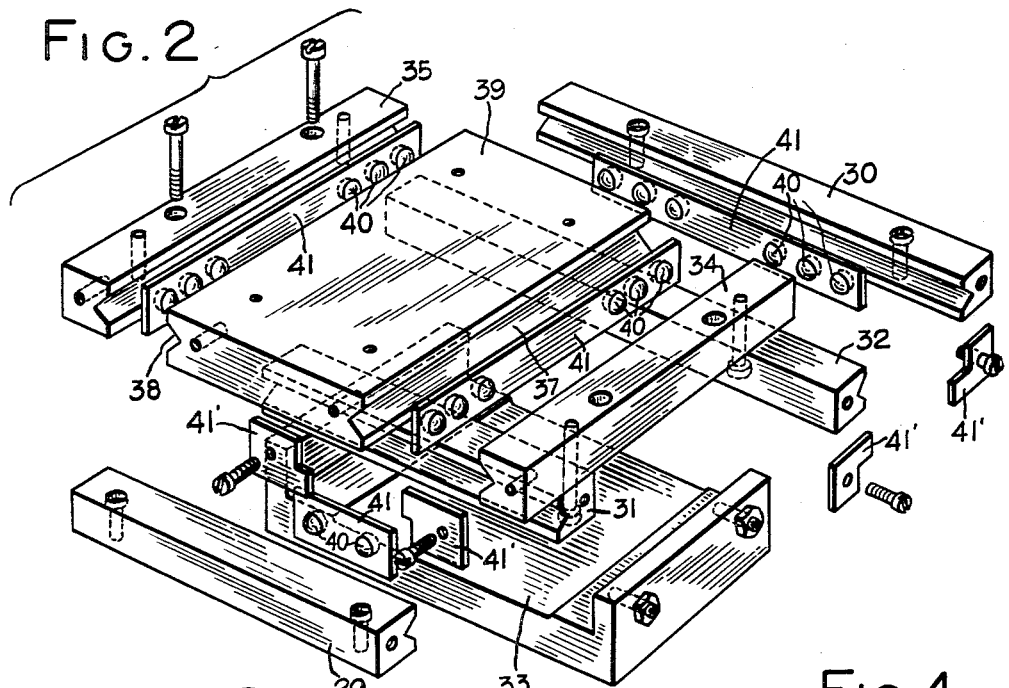
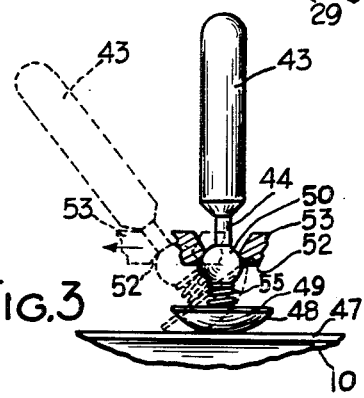
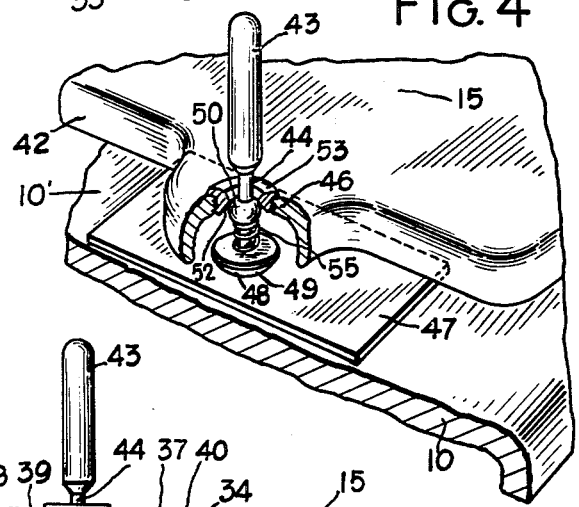
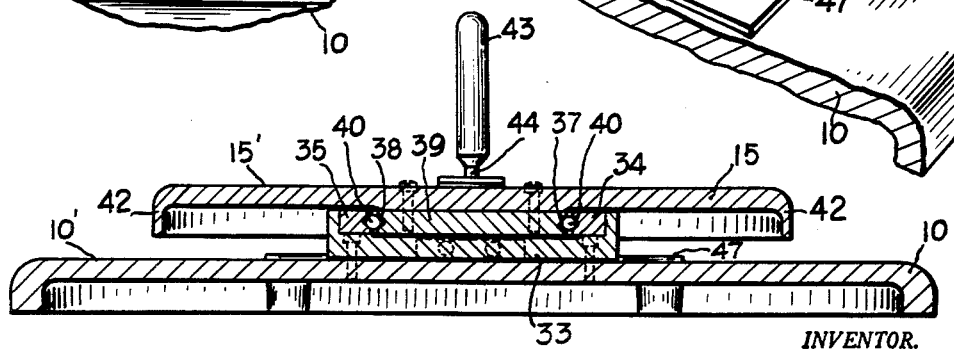
INVENTOR.
OLUF G. OSWOLD
ATTORNEYS

United States Patent Office 2,940,357
Patented June 14, 1960

2,940,357
ADJUSTING MECHANISM FOR SLIT LAMP APPARATUS

Oluf G. Oswold, Richmond, N.Y., assignor to Bausch & Lomb Optical Company, Rochester, N.Y., a corporation of New York Filed Mar. 7, 1955, Ser. No. 492,631

3 Claims. (Cl. 88—20)

This invention relates to ophthalmic instruments and more particularly it has reference to an adjusting mechanism for a slit lamp apparatus.

Ordinarily, a slit lamp apparatus is classified as either one of two principal types. The first type has the light source mounted to swing about an axis far removed from the patient being examined but close to the diagnostician. The second type has the light source and microscope mounted to move about a single common vertical axis of rotation which may be positioned so that it passes through the eye of the patient under examination. The current trend has been toward the second type of instrument wherein during an examination the axis must be shifted from one eye of the patient to the other. Once the light source and microscope have been so shifted, it is necessary to make an accurate adjustment of the instrument to align the light source and microscope with the exact area of the eye in question. One such instrument currently on the market has a universally mounted actuating means for positioning a light source and microscope relative to the eye of a patient and has the operating mechanism exposed so that it can become caked and fouled with dust and moisture which can impair its operation. This particular instrument also has some of its parts held together by gravity in such a manner that a slight bump can upset or dislocate parts of the instrument.

Other current instruments have equally unsatisfactory means for supporting and moving the light source and microscope relative to the eye of the patient.

It is, therefore, a primary object of this invention to overcome the above-noted disadvantages of the prior art and to provide a slit lamp apparatus having an improved adjusting mechanism which will be sensitive and accurate in operation, yet relatively simple and rugged in construction.

It is another object of this invention to provide a slit lamp apparatus having an improved adjusting means capable of precise and smooth, continuously variable adjustments of the light source and microscope relative to the area of the eye in question.

It is still another object of this invention to provide a slit lamp apparatus having an improved adjusting mechanism that is enclosed in such a way as to cover and protect the operating parts from dust and damage.

It is a further object of this invention to provide a slit lamp apparatus having an improved adjusting mechanism that is adapted to be easily manufactured and rapidly assembled.

And a still further object of this invention is to provide a slit lamp apparatus having an improved adjusting mechanism that is compact in size yet is capable of producing a wide range of adjustments.

These and other objects and advantages reside in certain novel features of construction, arrangement and combination of parts as will hereinafter be more fully described and pointed out in the appended claims.

Referring to the drawing:

Fig. 2 is an exploded view showing the slide mountings for the carriage of the device.

Fig. 3 is a view showing two positions of the lever for effecting movement of the carriage.

Fig. 4 is a perspective view, partly broken away, showing the means for effecting movement of the carriage.

Fig. 5 is a sectional view taken on the line 5—5 of Fig. 1.

Figure 1:
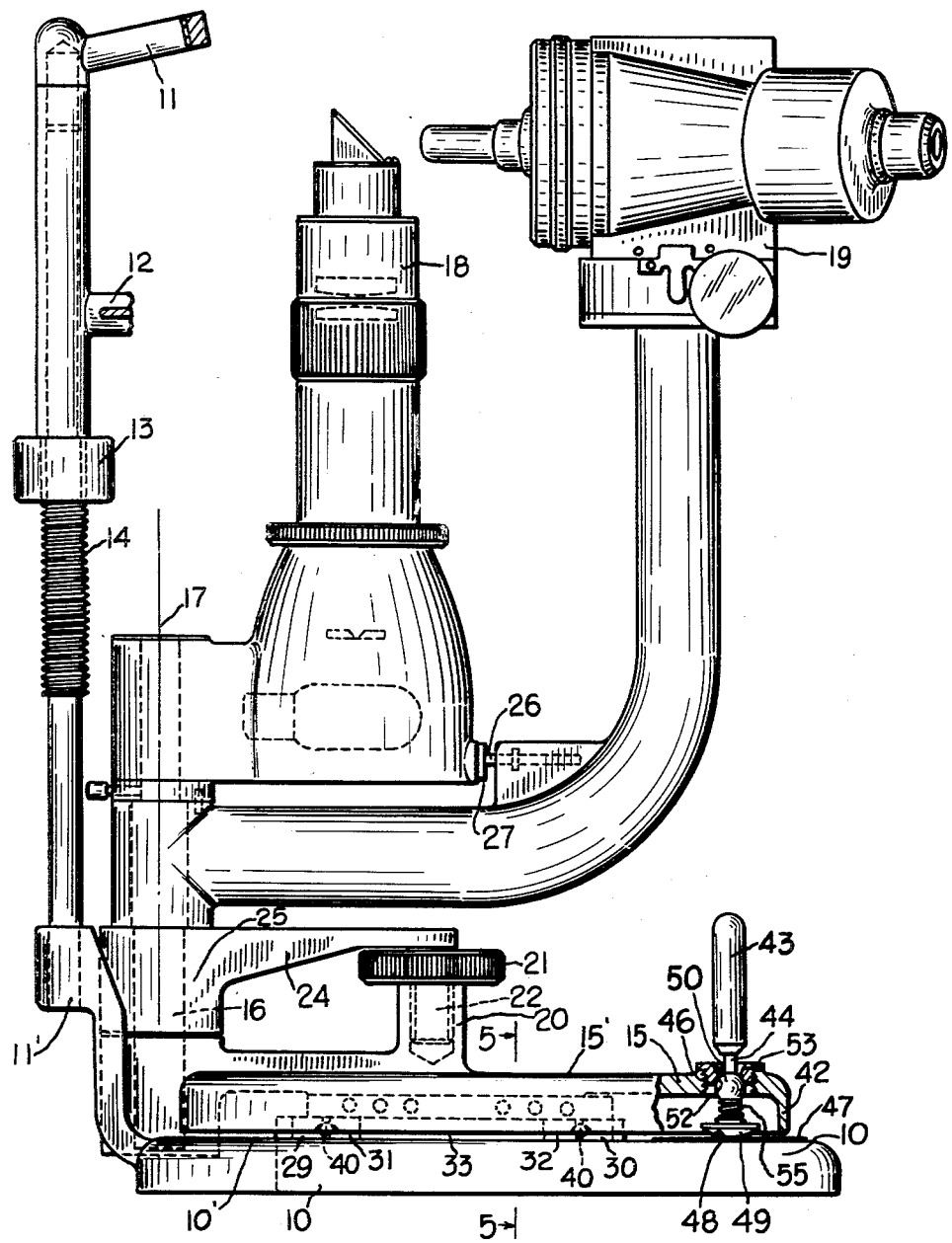
Fig. 1 is a side elevation of a slit lamp apparatus embodying the present invention, certain parts being broken away to better show details of construction.

Referring to the accompanying drawings, and more particularly to Fig. 1, there is shown a slit lamp apparatus comprising a base 10 having a flat, horizontally positioned top surface 10'. Attached to one end portion of base 10 is a bracket 11' which supports a head rest 11 having a chin rest 12 which is vertically adjustable by means of a nut 13 engaging with the threaded portion 14 whereby the head of a patient supported on the chin rest 12 can be comfortably positioned for examination.

Lying substantially parallel to, spaced from, and movably carried by the top surface 10' of the base 10 is a carriage 15 which has supported adjacent one edge of its top portion 15' a pivot member 16 having an upwardly extending vertical axis of swing 17 about which a light source 18 and an observation microscope 19 are mounted to turn either together or relative to each other. Upwardly extending from the top portion 15' of the carriage 15 is a hollow lug 20 which has seated against the upper end thereof a nut 21 into which is threaded a stud 22 rigidly fastened in depending relation from the under portion of an arm 24 of the motion transmitting element 25 operatively connected to the pivot member 16 in such a way that turning nut 21 will slide the motion transmitting element 25 vertically for raising and lowering the light source 18 and microscope 19 relative to the base 10 for aligning said instruments with the eye of a patient. A ball 26 and detent type stop means 27 are provided between the microscope 19 and the light source 18 for locking said instruments in fixed position relative to each other. A narrow band of illumination may be projected from the light source 18 into one eye of a patient whose head is supported on the head rest so that the observation microscope 19 can be used to view the illuminated portion of the eye.

A means for mounting said carriage 15 for longitudinal and transverse movement relative to said base 10 comprises a pair of spaced tracks 29, 30 positioned longitudinally of and fastened on said base 10 in cooperating relation with a mating pair of spaced tracks 31, 32 carried by a plate 33. Mounted on said plate 33 at right angles to said tracks 31, 32 is a pair of transversely positioned tracks 34, 35 which are adapted to cooperate with a mating pair of tracks 37, 38 formed in the block 39 which is carried by the underside of the carriage 15. Ball bearings 40 are freely rotatable in ball bearing cages 41 which are positioned between each set of mating tracks so that said plate 33 may move longitudinally relative to the base 10 and said carriage 15 may move transversely relative to said plate 33 whereby said carriage 15, light source 18 and microscope 19 will be freely movable longitudinally and transversely relative to the base 10. Mounted at the end of each track 29, 30, 31, 32, 34, 35, 37 and 38 is a stop element 41', only a few such elements being shown in Fig. 2. Each element 41' is constructed and arranged to prevent excessive horizontal and transverse movement of the carriage in any one direction. While the block 39 and its attached carriage 15 are freely movable in longitudinal and transverse directions, it will be apparent that they are held against movement in a vertical direction.

Depending from the edge of said carriage 15 is a skirt portion 42 which is adapted to conceal the operating parts of the above-enumerated means for mounting the carriage 15 for movement. The top portion 15' of the carriage covers an area less than the area of the top surface 10' of the base by an amount sufficient to permit the carriage 15 to move relative to the base within the confines of the area of the top surface of the base. The size of the skirt portion on the carriage and the relative sizes of the carriage and base combine to produce a structure that is both dust-free and stable in that foreign matter cannot get on the operating parts nor can the carriage overlap the edge of the base in an unstable manner. This results in a more stable, neater, and more efficiently operating mechanism.

Longitudinal and transverse movement of the carriage 15 relative to the base 10 is effected by a lever 43 having a narrow portion 44 which extends through an oversized opening 46 in the top portion 15' of the carriage 15 adjacent the edge thereof and opposite the edge carrying the pivot member 16. Mounted on the top surface 10' of the base is a flat friction surface 47 which is adapted to be contacted by a convex surface of revolution 48, such as a spherical surface, formed on a member 49 supported by the lower end of said lever 43. The area of said surface 47 is of such extent that the opening 46 will always overlie a portion of the surface 47 for all positions of the carriage 15. Said friction surface 47 can be formed of any material that is adapted to create a resistance to sliding without being abrasive and can be of the type sold under the trademark "Nylon" and commercially designated as FM–10001. Slidably mounted on said narrow portion 44 of the lever 43 between the carriage 15 and the member 49 is an apertured ball 50 which is adapted to fit into a seat 52 on the collar 53 threaded into the oversized opening 46. Carried by the lever 43 between the ball 50 and the member 49 is a spring 55 for urging said ball 50 and said convex surface of revolution 48 of the member 49 into engaging relation, respectively, with the seat 52 and with said friction surface 47 on the top surface of the base 10. The ball 50 may be of a diameter slightly larger than the diameter of the opening 46 whereby the ball may be seated against the edge of the oversized opening 46 without departing from the spirit of or affecting the scope of my invention.

Said spring 55 urges the convex surface of revolution 48 of the member 49 into engaging relation with the flat friction surface 47. The strength of said spring 55 is such that the frictional engagement between the convex surface 48 and the friction surface 47 may be overcome by exerting sufficient force on the carriage 15 in any direction with the confines of the top surface of the base 10 for producing gross movement of the carriage. The microscope 19 and light source 18 can be shifted from alignment with one eye of the patient to alignment with the other eye of the patient by overcoming the frictional resistance between the convex surface 48 and friction surface 47 whereby the convex surface 48 of member 49 is slid over the friction surface 47 for positioning the vertical axis 17 of the pivot 16 in approximate alignment with the other eye of the patient. The frictional resistance between the convex surface 48 and the friction surface 47 must be such that it can be overcome readily for gross movements of the carriage 15 and still be strong enough to hold the carriage 15 in fixed position when the light source 18 and microscope 19 are swung about the pivot member 16. In other words, the frictional resistance must be such that once the carriage is adjusted relative to the eye of the patient, the light source 18 and microscope 19 are held in position without the need of additional holding means.

The fine adjustment of said vertical axis 17 with respect to the precise portion of the eye of the patient under examination is accomplished by grasping the lever 43 and exerting a force in the direction in which it is desired to move the light source 18 and microscope 19.

A force on the lever 43 will cause the convex surface of revolution 48 to roll on the friction surface 47 whereby the ball 50 will slide in the seat 52 for moving the carriage 15 a small distance relative to the base.

When a force is applied to the upper portion of the lever 43 in a longitudinal direction, the carriage 15 will be constrained to move in the longitudinal direction relative to the base by means of the tracks 31, 32 and 29, 30. Likewise, when a force is applied to the lever 43 in a transverse direction, the carriage 15 will be constrained to move in the transverse direction relative to the base by means of the tracks 34, 35 and 37, 38. However, when a force is applied to the lever in a diagonal direction, the carriage 15 will be constrained to move in the diagonal direction relative to the base along a line which will be the resultant of the longitudinal and transverse components of the movement.

Any movement of the upper end of the lever 43 will be reduced to a small proportion thereof when transmitted to the carriage 15, so that very delicate adjustments of the light source and microscope can be made relative to the eye of the patient being examined.

It will be seen that there is here provided an improved adjusting mechanism for a slit lamp apparatus that will be sensitive and accurate in operation. The adjusting mechanism is capable of precise and smooth, continuously variable adjustments of the light source and microscope relative to the eye of the patient in both fine and gross amounts. The mechanism is compact in size and rugged in construction and is adapted to be easily manufactured and readily assembled. The instrument is neat in appearance having all the operating parts concealed from view as well as from dust, all substantially as set out in the foregoing objects of my invention.

Although only one embodiment of this invention has been shown and described in detail, it will be understood that other embodiments are possible and changes may be made in the form and arrangement of the parts and substitutions may be made therein without departing from the spirit of the invention as defined in the appended claims.

I claim:

1. In a slit lamp apparatus of the type including a base having a flat horizontal top surface, and a carriage movable in a horizontal plane above said surface, the combination comprising mounting means connected between the base and the carriage for supporting the carriage on the base freely movable relative thereto in a horizontal plane, and an actuator independent of said mounting means for controllably moving the carriage relative to the base, said actuator including a handle portion extending through the carriage and mounted thereon for limited universal movement, and a friction drive portion fixed to said handle portion at the lower end thereof, said friction drive portion having a convex smoothly curved surface in frictional engagement with the top surface of the base, and spring means operatively diposed between the carriage and said friction drive portion for keeping said curved surface in relatively uniform pressure engagement against the top surface of the base.

2. In a slit lamp apparatus of the type including a base having a flat horizontal top surface, and a carriage movable in a horizontal plane above said surface, the combination comprising mounting means connected between the base and the carriage for supporting the carriage on the base freely movable relative thereto in a horizontal plane, and an actuator independent of said mounting means controllably moving the carriage relative to the base, said actuator including a handle portion extending through the carriage and having a friction drive portion fixed at its lower end, said friction drive portion having a convex smoothly curved surface in a frictional engagement with the top surface of the base, a socket fixed in the carriage around said handle, a ball loosely mounted on said handle, and a compression spring disposed between said ball and said drive portion for urging said curved surface into relatively uniform pressure engagement against the top surface of the base.

3. In a slit lamp apparatus of the type including a base having a flat horizontal top surface, and a carriage movable in a horizontal plane above said surface, the combination comprising mounting means connected between the base and the carriage for supporting the carriage on the base freely movable relative thereto in a horizontal plane, and an actuator independent of said mounting means for controllably moving the carriage relative to the base, said actuator including a handle portion extending through the carriage and having a friction drive portion fixed at its lower end, said friction drive portion having a convex spherically curved surface in frictional engagement with the top surface of the base, a socket fixed in the carriage around said handle, a ball loosely mounted on said handle, and a compression spring disposed between said ball and said drive portion for urging said curved surface into relatively uniform pressure engagement against the top surface of the base.

References Cited in the file of this patent

UNITED STATES PATENTS

| 1,828,460 | Emerson | Oct. 20, 1931 |

FOREIGN PATENTS

| 499,112 | Great Britain | Jan. 18, 1939 |
| 662,940 | Great Britain | Dec. 12, 1951 |
| 812,730 | Germany | Sept. 3, 1951 |
| 827,721 | Germany | Jan. 14, 1952 |
| 951,417 | France | Apr. 18, 1949 |

OTHER REFERENCES

Berliner Text: Biomicroscopy of the Eye, vol. 1; published by Paul B. Hoeber, Inc., Medical Book Dept. of Harper & Brothers. Page 57. Copy of said volume in Bausch & Lomb Scientific Library (Group U; Acc. No. 747; dated November 6, 1943).